United States Patent
Yamamoto et al.

(10) Patent No.: US 7,547,797 B2
(45) Date of Patent: Jun. 16, 2009

(54) HIGHLY VOLATILE POLYETHER-MODIFIED SILICONE SURFACTANT

(75) Inventors: Akira Yamamoto, Gunma (JP); Shoji Ichinohe, Gunma (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 205 days.

(21) Appl. No.: 11/511,351

(22) Filed: Aug. 29, 2006

(65) Prior Publication Data

US 2007/0049509 A1 Mar. 1, 2007

(30) Foreign Application Priority Data

Aug. 30, 2005 (JP) ............................. 2005-248840

(51) Int. Cl.
 *C07F 7/08* (2006.01)
(52) U.S. Cl. ...................... 556/462; 556/450; 556/451; 556/453
(58) Field of Classification Search ................ 556/462, 556/450, 451, 453
 See application file for complete search history.

(56) References Cited

U.S. PATENT DOCUMENTS 5,558,806 A 9/1996 Policello et al.

FOREIGN PATENT DOCUMENTS

EP 1053678 A1 11/2000

OTHER PUBLICATIONS

P.J.G. Stevens; "Organosilicone Surfactants As Adjuvants For AgroChemicals"; Pesticide Science, Elsevier Applied Science Publisher.; Barking, GB; vol. 38 No. 2/3; Jan. 1993; pp. 103-122; XP000408739; ISSN: 0031-613X.

*Primary Examiner*—Elvis O Price
(74) *Attorney, Agent, or Firm*—Millen, White, Zelano, Branigan, P.C.

(57) ABSTRACT

A highly volatile electrical/electronic parts surfactant containing a polyether-modified silicone having one polyether chain in the molecule, wherein the surface tension at 25° C. of a 0.01 mass % aqueous solution thereof is 25 mN/m or less, the aforesaid silicone is expressed by the following average structural formula (1), and when heated from room temperature to 200° C. at a rate of 5° C./minute to 200° C. and maintained at a temperature of 200° C. for 100 minutes, the polyether-modified silicone completely volatilizes without leaving any remainder, and a method of manufacturing this highly volatile polyether-modified silicone are disclosed.

$$AMe_2SiO(MeASiO)_nSiMe_2A \quad (1)$$

In formula (1), any one of A is a substituent group expressed by the following general formula (2), the remaining A are methyl groups and n is an integer from 0-2.

$$-C_aH_{2a}O(C_2H_4O)_bR \quad (2)$$

In formula (2), a is 3-4, b is an integer from 1-7 and R is a methyl group or an ethyl group.

3 Claims, No Drawings

HIGHLY VOLATILE POLYETHER-MODIFIED SILICONE SURFACTANT

FIELD OF THE INVENTION

The present invention relates to a polyether-modified silicone surfactant having low surface tension and high volatility, and in particular, relates to a surfactant which completely volatilizes without leaving any remainder when heated to a high temperature for a fixed time, and which is therefore very suitable for cleaning electrical/electronic parts.

BACKGROUND OF THE INVENTION

Polyether-modified silicones are obtained by performing a hydrosilylation reaction of a polyether having a terminal double bond with a hydrogen silicone using a noble metal catalyst. Since they have a polyoxyalkylene chain in the molecule, they have conventionally been widely used in various industrial fields as nonionic surfactants. It is also known in the art that different performance and properties are obtained depending on the type and modification rate of the polyether having a terminal double bond (Nonpatent document 1, Patent document 1).

[Nonpatent document 1] Siloxane Polymers, Stephen J. Clarson/J. Anthony Semlyen PTR PRENTICE HALL p. 334-348.

[Patent document 1] Japanese Laid-Open Patent Application No. 2000-327787.

In the manufacture of electrical and electronic equipment, surfactants are used for cleaning substrates etc., but if the surfactant remains in the substrate after use, it will have an adverse effect on the water resistance of ink, or the electrical properties of electronic parts. In order to remove it completely, it is therefore required that it be highly volatile. In the prior art, as an example of a typical silicone which could be used as a surfactant, a polyether-modified silicone was known having a surface tension at 25° C. of 25 mN/m or less in a 0.01 mass % aqueous solution, but since it was not sufficiently volatile, it remained in the substrate even after use.

After they have been used, surfactants are usually removed by heating, but in the case of electrical/electronic parts, the heat resistance of the parts must be taken into consideration which places an upper limit of 200° C. on the heating temperature. Until now, a polyether-modified silicone which volatilizes completely on heating to 200° C. or less was not known, and a polyether-modified silicone which had the dual properties of low surface tension and high volatility was not known.

SUMMARY OF THE INVENTION

It is therefore an object of the invention to provide a surfactant consisting essentially of a polyether-modified silicone which volatilizes completely at 200° C., and can be removed easily by heating after use.

The Inventor, after performing extensive studies aimed at resolving the aforesaid problem, discovered that a polyether-modified silicone having only one polyether chain in the molecule has a surface tension of 25 mN/m or less at 25° C. when it is measured as a 0.01 mass % aqueous solution, and when this silicone was heated to 200° C. and kept at this temperature, it completely volatilized. It was thus particularly suitable as a surfactant for cleaning electrical and electronic parts, and this discovery led to the present invention.

The invention, therefore, is a highly volatile surfactant for electrical/electronic parts consisting essentially of a polyether-modified silicone having only one polyether chain in the molecule, and having a surface tension of 25 mN/m or less at 25° C. when measured as a 0.01 mass % aqueous solution, characterizing that said polyether-modified silicone has the following average structural formula (1), and completely volatilizes without leaving any remainder when it is heated from room temperature to 200° C. at a rate of 5° C./minute to 200° C. and the temperature is maintained at 200° C. for 100 minutes.

$$AMe_2SiO(MeASiO)_nSiMe_2A \qquad (1)$$

In formula (1), any one of A is a substituent group expressed by the following general formula (2), the remaining A are methyl groups, and n is an integer from 0-2.

$$-C_aH_{2a}O(C_2H_4O)_bR \qquad (2)$$

In formula (2), a is 3-4, b is an integer from 1-7 and R is a methyl group or an ethyl group.

ADVANTAGES OF THE INVENTION

Since the surfactant of this invention is completely removed by heating to 200° C. and maintaining this temperature, it is particularly suitable as a surfactant for electrical and electronic parts.

DESCRIPTION OF THE PREFERRED EMBODIMENTS

The surfactant of this invention is a polyether-modified silicone expressed by the following average structural formula (1) which has only one polyether chain per molecule. Since the surface tension of this silicone is small as compared with a silicone having two or more polyether chains, surface activity easily arises between the hydrophilic part and hydrophobic part of the molecule.

$$AMe_2SiO(MeASiO)_nSiMe_2A \qquad (1)$$

In formula (1), any one of A is a substituent group expressed by the following general formula (2), the remaining A are methyl groups and n is an integer from 0-2, but preferably 0 or 1. If n is larger than 3, the volatility of the polyether-modified silicone which is produced, decreases.

$$-C_aH_{2a}O(C_2H_4O)_bR \qquad (2)$$

In formula (2), a is an integer from 3-4 and b is an integer from 1-7. If b is larger than 7, the molecular weight of the polyether-modified silicone which is produced increases, and volatility decreases.

In order to enhance the volatility of the polyether-modified silicone, the terminal R in formula (2) is a methyl group or an ethyl group.

In order to use the surfactant of the present invention in the field of electrical and electronic parts, the surface tension of a 0.01% aqueous solution of the aforesaid polyether-modified silicone at 25° C. must be 25 mN/m or less. If the surface tension exceeds 25 mN/m, wettability worsens and cleaning properties are poorer.

The polyether-modified silicone of the present invention is manufactured by reacting a hydrogen dimethylpolysiloxane having only one hydrosilyl group expressed by the following structural formula (3) in the molecule with a polyether having one terminal unsaturated group expressed by the following formula (4).

$$BMe_2SiO(MeBSiO)_nSiMe_2B \qquad (3)$$

In formula (3), any one of B is a hydrogen atom, the remaining B are methyl groups, and n is identical to its value in the aforesaid structural formula (1).

$$C_aH_{2a-1}O(C_2H_4O)_bR \quad (4)$$

In formula (4), a, b, R have identical values to those in the aforesaid general formula (2).

The structure of $C_aH_{2a-1}$ which is the unsaturated group in the formula is not particularly limited, but when hydrogen dimethylpolysiloxane is reacted with an equimolar amount of terminal allyl polyether, unreacted polyether accounts for approximately 15 mole % of the polyether introduced, and when hydrogen dimethylpolysiloxane is reacted with an equimolar amount of terminal methallyl polyether, unreacted polyether accounts for approximately 5 mole % of the polyether introduced. This is due to the fact that, apart from the addition reaction, an internal rearrangement takes place in the terminal double bond of the polyether. This internally rearranged olefin remains in the polyether silicone without undergoing an addition reaction with hydrogen dimethylpolysiloxane, and decreases the polyether silicone content of the surfactant.

In this invention, therefore, from the viewpoint of decreasing the unreacted fraction, a polyether containing a methallyl group ($CH_2$=$C(CH_3)CH_2$—) is particularly preferred.

Further, from the viewpoint of enhancing the volatility of the obtained polyether-modified silicone, the terminal R in formula (4) must be a methyl group or an ethyl group.

The following are examples of polyethers having a terminal unsaturated group expressed by the aforesaid formula (4).

Polyethers containing a methallyl group: $CH_2$=$C(CH_3)$ $CH_2O(EO)_1CH_3$, $CH_2$=$C(CH_3)$ $CH_2O(EO)_2CH_3$, $CH_2$=$C(CH_3)$ $CH_2O(EO)_3CH_3$, $CH_2$=$C(CH_3)$ $CH_2O(EO)_4CH_3$, $CH_2$=$C(CH_3)$ $CH_2O(EO)_5CH_3$, $CH_2$=$CCH_3)$ $CH_2OEO)_6$ $CH_3CH_2$=$C(CH_3)$ $CH_2O(EO)_7CH_3$, $CH_2$=$C(CH_3)$ $CH_2O$ $(EO)_1CH_2CH_3$, $CH_2$=$C(CH_3)$ $CH_2O(EO)_2CH_2CH_3$, $CH_2$=$C(CH_3)$ $CH_2O(EO)_3CH_2CH_3$, $CH_2$=$C(CH_3)$ $CH_2O$ $(EO)_4CH_2CH_3$ $CH_2$=$C(CH_3)$ $CH_2O(EO)_5CH_2CH_3$ $CH_2$=$C(CH_3)$ $CH_2O(EO)_6CH_2CH_3$ and $CH_2$=$C(CH_3)$ $CH_2O(EO)_7CH_2CH_3$ Polyethers containing an allyl group: $CH_2$=$CHCH_2O$ $(EO)_1CH_3$, $CH_2$=$CHCH_2O(EO)_2CH_3$, $CH_2$=$CHCH_2O$ $(EO)_3CH_3$, $CH_2$=$CHCH_2O(EO)_4CH_3$, $CH_2$=$CHCH_2O$ $(EO)_5CH_3$, $CH_2$=$CHCH_2O(EO)_6CH_3$, $CH_2$=$CHCH_2O$ $(EO)_7CH_3$, $CH_2$=$CHCH_2O(EO)_1CH_2CH_3$, $CH_2$=$CHCH_2O(EO)_2CH_2CH_3$, $CH_2$=$CHCH_2O(EO)_3$ $CH_2CH_3$, $CH_2$=$CHCH_2O(EO)_4CH_2CH_3$, $CH_2$=$CHCH_2O$ $(EO)_5CH_2CH_3$, $CH_2$=$CHCH_2O(EO)_6CH_2CH_3$ and $CH_2$=$CHCH_2O(EO)_7CH_2CH_3$ (where, E in the formulae means —$CH_2CH_2$—).

To reduce ionic impurities, these polyethers are usually used after distillation.

The reaction between the aforesaid hydrogen dimethylpolysiloxane (A) and the polyether (B) having one terminal double bond is performed in the presence or absence of a solvent. The catalyst is preferably a platinum catalyst derived from chloroplatinic acid.

The reaction is preferably performed by introducing (A) and then dripping in the catalyst and (B), or introducing the catalyst and (B) and then dripping in (A). To suppress oxidation of the polyether, the reaction is preferably performed in a current of nitrogen.

Since the boiling point of (A) may be 100° C. or less, the temperature when the reactants are dripped in is preferably 100° C. or less to prevent vaporization of (A).

After the reactants have been dripped in, the temperature of the reaction system is raised to 110-120° C., and maintained at this level to complete the reaction. The conclusion of the reaction is verified by sampling the reaction solution and measuring the amount of hydrogen gas produced.

The reaction molar ratio (SiH/Vi) of polyether (B) to SiH in the hydrogen dimethylpolysiloxane (A) is 0.5-1.2, and if there is too much unreacted polyether, the purity of the polyether-modified silicone will decrease. Therefore, after performing the reaction below a molar ratio of 1 (SiH/Vi<1), it is preferable to remove the excess of low boiling hydrogen dimethylpolysiloxane by performing a reduced pressure strip so as to suppress the amount of unreacted polyether in the polyether-modified silicone to the minimum.

When using a low boiling polyether as a starting material, unreacted polyether can be removed after the reaction by performing a reduced pressure strip, so there is no problem even if an excess of polyether relative to (A) is used.

Hereafter, this invention will be described in further detail referring to specific examples and comparative examples, but it is to be understood that the invention is not to be construed as being limited in any way thereby. In addition, all starting material polyethers in the examples are distilled products, and are single items except where a product distribution is indicated.

EXAMPLE 1

262 g (1 mole) of a polyether having the structure $CH_2$=$C$ $(CH_3)$ $CH_2O(EO)_4CH_3$ and 0.5 g of a 0.5 mass % toluene solution of chloroplatinic acid were weighed out in a flask, and heated to 70° C. in a current of nitrogen.

At 70° C., 178 g (1.2 moles) of pentamethyldisiloxane ($Me_3SiOSiMe_2H$, bp. 85° C.) was dripped in over 30 minutes. At this time, the temperature of the reaction system rose to 90° C. The temperature was then raised to 110° C., and maintained at 110° C. for 3 hours to complete the reaction.

After performing a reduced pressure strip of excess pentamethyldisiloxane, 390 g of a polyether silicone A was obtained.

EXAMPLE 2

248 g (1 mole) of a polyether having the structure $CH_2$=$CH$ $CH_2O(EO)_4CH_3$ and 0.5 g of a 0.5 mass % toluene solution of chloroplatinic acid were weighed out in a flask, and heated to 70° C. in a current of nitrogen.

At 70° C., 178 g (1.2 moles) of pentamethyldisiloxane ($Me_3SiOSiMe_2H$, bp. 85° C.) was dripped in over 30 minutes. At this time, the temperature of the reaction system rose to 85° C. The temperature was then raised to 110° C., and maintained at 110° C. for 3 hours to complete the reaction.

After performing a reduced pressure strip of excess pentamethyldisiloxane, 370 g of a polyether silicone B was obtained.

EXAMPLE 3

306 g (1 mole) of a polyether having the structure $CH_2$=$C$ $(CH_3)CH_2O(EO)_5CH_3$ and 0.5 g of a 0.5 mass % toluene solution of chloroplatinic acid were weighed out in a flask, and heated to 70° C. in a current of nitrogen.

At 70° C., 178 g (1.2 moles) of pentamethyldisiloxane ($Me_3SiOSiMe_2H$, bp. 85° C.) was dripped in over 30 minutes. At this time, the temperature of the reaction system rose to 90° C. The temperature was then raised to 110° C., and maintained at 110° C. for 3 hours to complete the reaction.

After performing a reduced pressure strip of excess pentamethyldisiloxane, 440 g of a polyether silicone C was obtained.

EXAMPLE 4

292 g (1 mole) of a polyether having the structure $CH_2$=$CHCH_2O(EO)_5CH_3$ and 0.5 g of a 0.5 mass % toluene solution of chloroplatinic acid were weighed out in a flask, and heated to 70° C. in a current of nitrogen.

At 70° C., 178 g (1.2 moles) of pentamethyldisiloxane ($Me_3SiOSiMe_2H$, bp. 85° C.) was dripped in over 30 minutes. At this time, the temperature of the reaction system rose to 85° C. The temperature was then raised to 110° C., and maintained at 110° C. for 3 hours to complete the reaction.

After performing a reduced pressure strip of excess pentamethyldisiloxane, 420 g of a polyether silicone D was obtained.

EXAMPLE 5

350 g of a polyether having the structure $CH_2$=$C(CH_3)CH_2O(EO)_nCH_3$ [n=5 (17%), n=6 (70%), n=7 (13%)] and 0.5 g of a 0.5 mass % toluene solution of chloroplatinic acid were weighed out in a flask, and heated to 90° C. in a current of nitrogen.

At 90° C., 266 g (1.2 moles) of heptamethyltrisiloxane ($Me_3SiOSiMeHOSiMe_3$, bp. 141° C.) was dripped in over 30 minutes. At this time, the temperature of the reaction system rose to 105° C. The temperature was then raised to 110° C., and maintained at 110° C. for 3 hours to complete the reaction.

After performing a reduced pressure strip of excess heptamethyltrisiloxane, 540 g of a polyether silicone E was obtained.

EXAMPLE 6

336 g of a polyether having the structure $CH_2$=$CHCH_2O(EO)_nCH_3$ [n=5 (12%), n=6 (74%), n=7 (14%)] and 0.5 g of a 0.5 mass % toluene solution of chloroplatinic acid were weighed out in a flask, and heated to 90° C. in a current of nitrogen.

At 90° C., 266 g (1.2 moles) of heptamethyltrisiloxane ($Me_3SiOSiMeHOSiMe_3$, bp. 141° C.) was dripped in over 30 minutes. At this time, the temperature of the reaction system rose to 105° C. The temperature was then raised to 110° C., and maintained at 110° C. for 3 hours to complete the reaction.

After performing a reduced pressure strip of excess heptamethyltrisiloxane, 520 g of a polyether silicone F was obtained.

COMPARATIVE EXAMPLE 1

204 g (1 mole) of a polyether having the structure $CH_2$=$CHCH_2O(EO)_3CH_3$ and 0.5 g of a 0.5 mass % toluene solution of chloroplatinic acid were weighed out in a flask, and heated to 70° C. in a current of nitrogen.

At 70° C., 54 g (0.4 moles) of tetramethyldisiloxane ($HMe_2SiOSiMe_2H$, bp. 71° C.) was dripped in over 30 minutes. At this time, the temperature of the reaction system rose to 95° C. The temperature was then raised to 110° C., and maintained at 110° C. for 3 hours to complete the reaction.

After performing a reduced pressure strip of the reaction solution, 250 g of a polyether silicone A' was obtained.

COMPARATIVE EXAMPLE 2

An identical procedure to that of Example 1 was used, except that $CH_2$=$C(CH_3)CH_2O(EO)_4CH_3$ used in Example 1 was replaced by 218 g (1 mole) of $CH_2$=$C(CH_3)CH_2O(EO)_3CH_3$, and 340 g of a polyether silicone B' was thereby obtained.

COMPARATIVE EXAMPLE 3

An identical procedure to that of Example 1 was used, except that $CH_2$=$C(CH_3)CH_2O(EO)_4CH_3$ used in Example 1 was replaced by 336 g of a polyether $CH_2$=$CHCH_2O(EO)_nCH_3$ [n=5 (12%), n=6 (74%), n=7 (14%)], and 460 g of a polyether silicone C' was thereby obtained.

The surface tension was measured by the platinum plate method at 25° C. using a Kyowa Surfactant Chemicals Ltd. Automatic Surface Tensiometer CBVP-Z.

The volatility at 200° C. was measured in a nitrogen enclosure using a Rigaku Thermo plus TG8120. As heating conditions, the temperature was raised from room temperature to 200° C. at a heating rate of 5° C./min, maintained at 200° C., and the heating time from start of temperature increases was a total of 100 minutes.

The volatility was assessed as follows.

◯: Good volatility (residue of polyether silicone after heating time has elapsed is 0%).

Δ: Fairly good volatility (residue of polyether silicone after heating time has elapsed is 5% or less).

×: Poor volatility (residue of polyether silicone after heating time has elapsed is more than 10%).

The surface tension (mN/m) at 25° C. of a 0.01 mass % aqueous solution and its volatility at 200° C. were measured using the polyether silicones of Examples 1-6 and Comparative Examples 1-4.

TABLE 1 shows the results.

TABLE 1

| | Polyether silicone | Surface tension (mN/m) 0.10% | Surface tension (mN/m) 0.01% | Volatility |
|---|---|---|---|---|
| Example 1 | A | 22.6 | 22 | ◯ |
| Example 2 | B | 22.3 | 24.3 | ◯ |
| Example 3 | C | 21.8 | 22 | ◯ |
| Example 4 | D | 22.3 | 24.9 | ◯ |
| Example 5 | E | 20 | 20.2 | ◯ |
| Example 6 | F | 20.1 | 20.4 | ◯ |
| Comparative Example 1 | A' | 28.1 | 33.6 | Δ |
| Comparative Example 2 | B' | 25.5 | 28 | ◯ |
| Comparative Example 3 | C' | 23.3 | 33 | ◯ |
| Comparative Example 4 | Silwet L-77 | 20 | 20.2 | X |

From TABLE 1, it is seen that for the polyether silicones of Examples 1-6, the surface tension at 25° C. of a 0.01 mass % aqueous solution was less than 25 mN/m, and their volatility at 200° C. was also good.

INDUSTRIAL APPLICABILITY

The surfactant of the invention uses a polyether silicone having a surface tension of 25 mN/m or less at 25° C. in 0.01% aqueous solution and high volatility at 200° C., so the surfactant has wide utility in the field of electrical and electronic parts.

What is claimed is:

1. A method of manufacturing a highly volatile electrical/electronic component surfactant containing a polyether-modified silicone having one polyether chain in the molecule, wherein the surface tension at 25° C. of a 0.01 mass % aqueous solution thereof is 25 mN/m or less, and when the polyether-modified silicone is heated from room temperature to 200° C. at a rate of 5° C./minute to 200° C. and the temperature is maintained at 200° C. for 100 minutes, the polyether-modified silicone completely volatilizes said method comprising a step for reacting a hydrogen dimethylpolysiloxane having one hydrosilyl group expressed by the following structural formula (3) in the molecule with a polyether having one terminal unsaturated group expressed by the following formula (4):

$$BMe_2SiO(MeBSiO)_nSiMe_2B \qquad (3)$$

wherein in formula (3), any one of B is a hydrogen atom, the remaining B are methyl groups, and n is an integer from 0-2, $$C_aH_{2a-1}O(C_2H_4O)_bR \qquad (4)$$

and in formula (4), a is 3-4, b is an integer from 1-7 and R is a methyl group or an ethyl group.

2. The manufacturing method according to claim 1, wherein the unsaturated hydrocarbon group $C_aH_{2a-1}$ of formula (4) has a terminal double bond.

3. The manufacturing method according to claim 2, wherein said unsaturated hydrocarbon group is a methallyl group.

* * * * *